United States Patent [19]

Yasutake

[11] 4,424,567
[45] Jan. 3, 1984

[54] ELECTRONIC CASH REGISTER WITH TIMEKEEPER

[75] Inventor: Kunio Yasutake, Akigawa, Japan

[73] Assignee: Casio Computer Co., Ltd., Tokyo, Japan

[21] Appl. No.: 442,841

[22] Filed: Nov. 18, 1982

Related U.S. Application Data

[63] Continuation of Ser. No. 102,769, Dec. 12, 1979, abandoned.

[30] Foreign Application Priority Data

Dec. 21, 1978 [JP] Japan .................. 53-157953
Dec. 21, 1978 [JP] Japan .................. 53-157954

[51] Int. Cl.³ .................. G06F 15/21; G06F 15/02
[52] U.S. Cl. .................. 364/405; 364/900; 364/709
[58] Field of Search .............. 364/405, 705, 709, 715, 364/200 MS File, 900 MS File; 368/28, 29, 30, 31, 69, 70

[56] References Cited

U.S. PATENT DOCUMENTS

| 3,943,696 | 3/1976 | Portman et al. ............... 368/29 |
| 4,159,533 | 6/1979 | Sakurai ............... 364/405 |
| 4,186,439 | 1/1980 | Shimura et al. ............... 364/405 |
| 4,245,311 | 1/1981 | Nakamura ............... 364/405 |
| 4,247,927 | 1/1981 | Oooka et al. ............... 368/69 |
| 4,276,606 | 6/1981 | Harigaya et al. ............... 364/709 |

FOREIGN PATENT DOCUMENTS 849026 9/1960 United Kingdom .
1508441 4/1978 United Kingdom .

*Primary Examiner*—Eddie P. Chan
*Attorney, Agent, or Firm*—Frishauf, Holtz, Goodman & Woodward

[57] ABSTRACT

A date data input/output control system for electronic device allows date data, such as "year", "month" and "day" to be inputted in any order into a CPU from an input device. A mode may be specified corresponding to the inputting order of the date data in a CPU. The date data inputted are rearranged in the CPU into a given time counting order in accordance with the mode specified, and stored in a memory in the given time counting order. In displaying or printing in an output device the date data thus stored, the date data are rearranged in the CPU into an order corresponding to the specified mode.

2 Claims, 12 Drawing Figures

| COLUMN | 15 14 13 12 | 11 10 9 | 8 | 7 6 5 | 4 3 | 2 1 | 0 | |
|---|---|---|---|---|---|---|---|---|
| | TIMER | YEAR | MONTH | DATE | HOUR | MINUTE | SECOND | 0 |
| | ALARM IV | ALARM III | | ALARM II | | ALARM I | | 1 ROW |

FIG. 5
FIG. 6
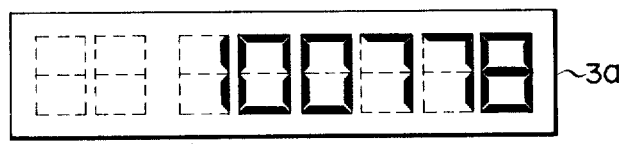

ELECTRONIC CASH REGISTER WITH TIMEKEEPER

This is a continuation of application Ser. No. 102,769, filed Dec. 12, 1979, now abandoned.

BACKGROUND OF THE INVENTION

The present invention relates to a date data input/output control system for an electronic device.

Some electronic devices such as electronic cash registers and electronic calculators have a time count function and process data with respect to time. In this type of device, when the time data such as the time of day and date produced by a timekeeping circuit is transferred to the main unit, such as the cash register or calculator, the timekeeping data is temporarily stored in a memory, and then is read out and transferred to the device proper. In updating the time count data, the time count data is read out every second from the timekeeping circuit. The time count data read out is subjected to an addition of one second to successively apply carries produced to greater units of time. In storing the time count data into the memory, the data are successively stored, in the order of "year", "month" and "day" in accordance with a stored order of the memory, and are printed and displayed in the same order.

In the U.S.A., the date is generally expressed in the order of "month", "day" and "year". In Europe, the date expression is generally in the order of "day", "month" and "year". If the date is printed or displayed, for example, using the Japanese date expression, "year", "month" and "day", people not accustomed to such a date expression may become puzzled. Accordingly, the electronic device of which the date expression may be flexibly changed in conformity with any style of the date expression, has been desired.

Accordingly, an object of the present invention is to provide a date data input/output control system for an electronic device which allows the date data to be inputted thereto in any given order, allows the internal time counting process to be carried out in a predetermined order which may be different from the inputted order, and allows the date data to be outputted corresponding to the order inputted or any other order.

SUMMARY OF THE INVENTION

According to the present invention a date data input and output control system comprises time counting means for automatically and sequentially updating time data, the time data including year, month, date, hour, minute and second data, in a given sequential order; a central processing unit coupled to the time counting means; a mode switch means coupled to the central processing unit for designating an order of date data of the year, month and date which is inputted and which is to be outputted; input means coupled to the central processing unit for inputting the date data of the year, month and date according to the order designated by the mode switch means; and output means coupled to the central processing unit for outputting the date data of the year, month and date according to the order designated by the mode switch means. The central processing unit includes a first converting means responsive to the mode swich means for converting date data inputted in an order designated by the mode switch means to date data in the given sequential order of the time counting of the time counting means; a second converting means responsive to the mode switch means for converting the date data in the time counting means to date data in an order designated by the mode switch means; means coupled to the first converting means for setting the inputted date data converted by the first converting means into the time counting means for updating of the inputted data by the time counting means; and means coupled to the second converting means for outputting the date data converted by the second converting means when date data is to be outputted.

With such a construction, the order of the date data inputted may automatically be rearranged by designating a mode in accordance with a country in which the electronic device with the date data input/output system of the invention is used. Accordingly, the date data may be inputted in any order. In the output process of the date data, the outputting order of the date data is rearranged according to the mode designated. Thus, mere designation of a mode can reliably display or print the data in conformity with the desired date expression, when the input/output system of the invention is used. The date printed or displayed is easy to read by people in any country.

BRIEF DESCRIPTION OF THE DRAWINGS

FIGS. 5(a), 5(b), 5(c), and 5(d) show the states of the data stored in the memory circuit and the states of the data stored in the registers X and Y at the time of the date data output;

FIG. 6 shows an example of date data display;

DETAILED DESCRIPTION

Figure 1:
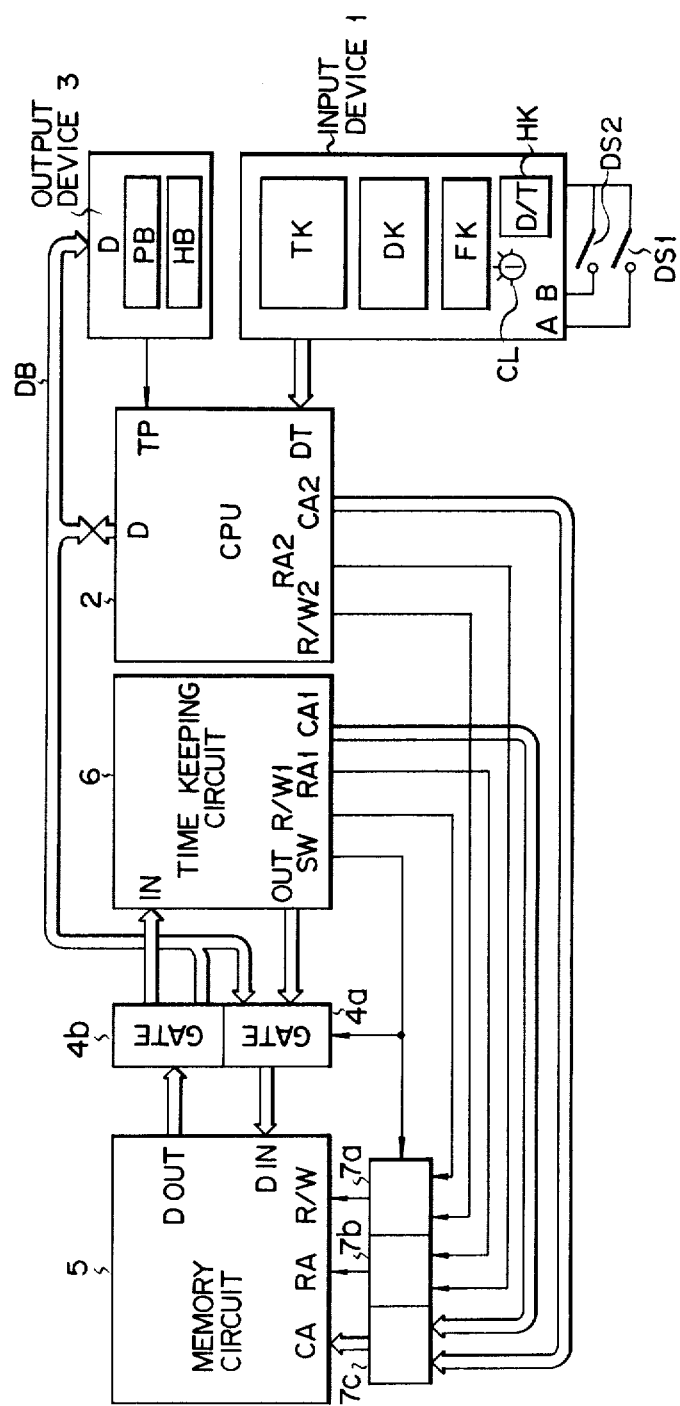
FIG. 1 shows an overall system of an electronic cash register to which a date data input/output system according to the invention is incorporated.
Figures 2, 3A, 3B, 7:
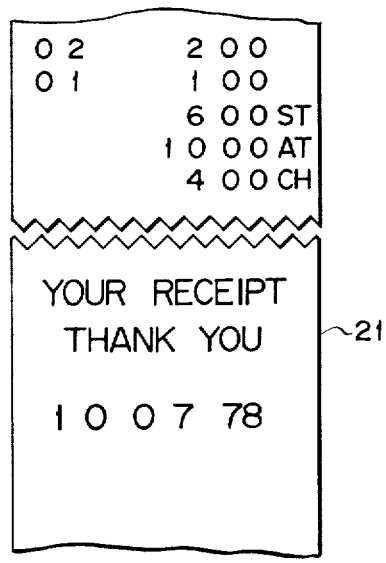
FIG. 2 shows the contents of a memory circuit used in FIG. 1.
FIGS. 3A and 3B show the state of the data stored in the registers X and Y to illustrate a change of the order of the date data.
FIG. 7 shows an example of date data printed.

FIG. 1 shows an embodiment of the invention wherein a date data input/output control system is applied to a cash register. In the figure, reference numeral 1 denotes the input device. The input device 1 comprises an entry key TK for entering the price of goods or the like, a department key DK for designating the department of the goods, a function key FK comprised of a cash amount tendered key and others, a D/T key HK for setting and displaying time count data, and a control lock CL to designate modes such as setting, registering, settling, and checking. The setting, registering, settling, and checking modes of the control lock CL, respectively, are used in setting the data for setting the time of day, the item number of goods, etc, making ordinary cash transactions, cleaning the device after the data stored is read out, and reading out the data from the memory without destroying the data stored. Further, the input device has switches $DS_1$ and $DS_2$ to designate the order of sequence of the date data when those are inputted and outputted. When the switch $DS_1$ only is turned on, a mode A is designated. A mode B is designated by turning on the switch $DS_2$. A mode C is designated by turning off both of the switches DS$_1$ and DS$_2$. In those modes, the input and output processings of the date data are performed in the following order or sequence of the date data;

Mode A . . . month, day and year
Mode B . . . day, month and year
Mode C . . . year, month and day The data inputted by the input device 1 is sent to a CPU 2, which is connected to an output device 3 for display and print-out via a data bus DB and also connected to the data input terminals D$_{IN}$ and D$_{OUT}$ of a memory circuit 5 via gate circuits 4a and 4b. The output device 3 is provided with a buffer register PB for printing and a buffer register HB for display. The memory circuit 5 is connected with the data output terminal OUT and the data input terminal IN of a timekeeping circuit 6 via gate circuits 4a and 4b. The memory circuit 5 is supplied with read/write registers R/W$_1$ and R/W$_2$, row address signals RA$_1$ and RA$_2$, and column address signals CA$_1$ and CA$_2$ through gate circuits 7a to 7c from the timekeeping circuit 6 and the CPU 2. The gate circuits 4a, 4b and 7a to 7c switch the memory circuit 5 between the timekeeping circuit 6 and the CPU depending upon a switching signal SW from the timekeeping circuit 6. The memory circuit 5 stores the time setting data such as a alarm time and a given time interval or the like, and the present time, and is constructed as shown in FIG. 2. The memory circuit 5 is composed of 2 rows and 16 columns. The time count data of the present data and time of day are loaded into the columns 11 through 0 of the row 1. The timer set data is loaded into the columns 15 to 12 of the same row. The time-of-day data such as hours and minutes of four alarms I to IV are written into the columns 15 through 0 of the first row. The timekeeping circuit has an oscillator to generate a reference pulse signal of 32768 Hz, which is frequency-divided to obtain a signal with a period of one second. Each time the one-second signal is received, the time-of-day data is read out of the memory circuit 5, and the one second data is subjected to a +1 operations. Through the +1 operation, a carry process is performed if carries occur. In this way, the present time of day is counted. The result of the time count is loaded into the memory circuit 5. The timekeeping circuit 6 temporarily stores "hour" and "minute" time data. After the time count data is loaded, the alarm data is read out of the memory circuit 5. The alarm data read out is compared with the time count data held by the timekeeping circuit 6. When those are coincident with each other, an alarm action is conducted. When the count data is updated and compared, the timekeeping circuit 6 produces a switch signal SW to switch the gate circuits 4a, 4b and 7a to 7c to the timekeeping circuit 6. As a result, the access of the CPU 2 for the memory circuit 5 is prohibited.

The CPU 2, provided with the X register 11 and the Y register 12 as shown in FIG. 3(A) and FIG. 3(B), is so designed that these registers change the order of sequence of the date data according to the mode setting by the switches DS$_1$ and DS$_2$. The CPU 2 is supplied with a print timing signal TP from the output device 3. In response to the timing signal, the CPU 2 produces the print data.

Figure 4:
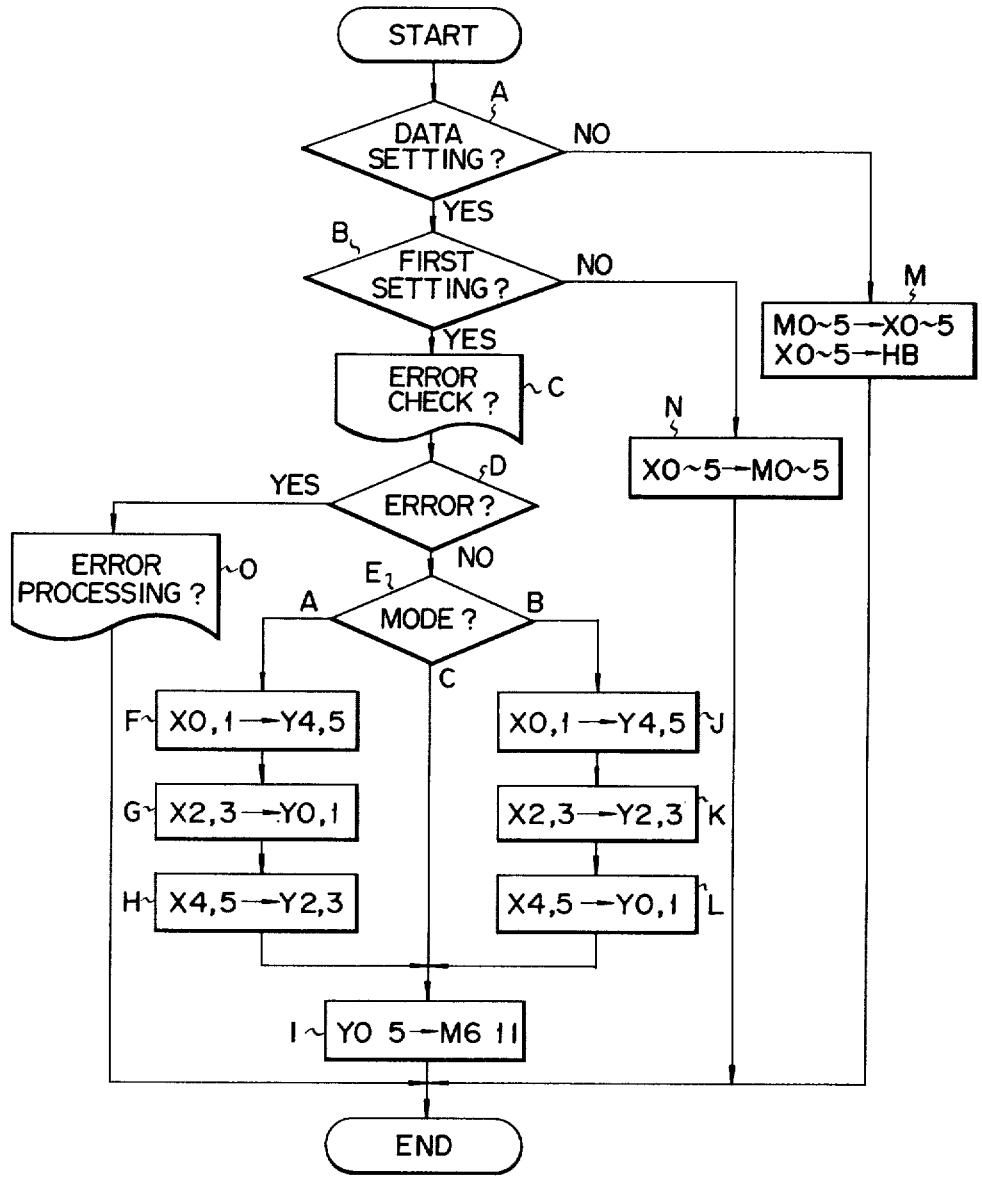
FIG. 4 shows a flow chart to explain the operation of the system when the date data is set therein.

The operation of the embodiment thus constructed will be described with reference to the flow chart shown in FIG. 4. For setting date data, the control lock CL of the input device 1 shown in FIG. 1 is set at the "set" position. If the date data is to be set in the order of month, day, and year, the switch DS$_1$ is turned on and the switch DS$_2$ is turned off to designate the mode A. If the date data to be set is Oct. 7, 1978 for instance, "100778" are entered by the use of the entry keys TK. The date data is then transferred from the input device 1 to the CPU 2 to be loaded in the X register 11 as shown in FIG. 3(A). The operation of the D/T key will arrange the data "100778" held in the X register 11 in the order of year, month, and day in accordance with the flow chart in FIG. 4 and is set in the Y register 12. That is, when the D/T key is depressed, the flow chart of FIG. 4 starts. Firstly, it is checked whether the control lock CL is in the "set" mode or not. If it is not in the "set" mode, the depression of the D/T key is interpreted as the instruction for the time count data display, so that the operation of the CPU 2 proceeds to a step M. In this step, the data "hour, minute and second" held in the columns 0 to 5 of the row 0 is transferred to the 0th to 5th digits of the X register 11. Further, the contents in those digits of the X register 11 is transferred to the display buffer register HB of the output device 3. The output device 3 then displays the contents of the display buffer register HB by the display section 3a as shown in FIG. 6. If it is in the "set" mode, the CPU proceeds to a step B to check whether the depression of the D/T key is made for the first time. If it is not the first time, the CPU 2 proceeds to an step N where the time-of-day data stored in the digits 0 to 5 of the X register 11 will be transferred to the columns 0 to 5, "M$_{0-5}$", in the row 0 of the memory circuit 5. If it is the first time, the CPU 2 proceeds to the step C to make the error checking. In this step C, the number of digits of the input data is checked to see if it is correct and whether or not the input data of month, day and year meet given requrements, that is to say, in the case of "month" data, if it falls between 1 and 12 or not. In a step D, whether or not any error is detected in the step C is examined. If any error has been detected, the CPU 2 will proceed to a step 0 to perform an error process. If no error has been detected, the CPU 2 advances to a step E where what mode was set up by the switches DS$_1$ and DS$_2$ is judged. If the mode set up is the mode A, the CPU 2 goes through steps F, G, and H to a step I. If the mode B was selected, the CPU 2 goes through steps J, K, and L to the step I. If the step C was selected, the function goes directly to the step I. As described above, in the case of mode A being set up with the switch DS$_1$ turned on, the data of year "78" held in the digits 0 and 1 of the X register 11 is transferred to the digits 4 and 5 of the X register 12 in the step F as shown in FIG. 3(A) and FIG. 3(B). In the step G, the data of day "07" held in the digits 2 ad 3 of the X register 11 is transferred to the digits 0 and 1 of the Y register 12. Further, in the step H, the data of month "10" held in the digits 4 and 5, "X4, 5", of the X register 11 is transferred to the digits 2 and 3 of the Y register 12. That is, the steps F, G and H rearrange the date data in the order of year, month, and day to set it in the Y register 12. In the step I, the date data set in the Y register 12 is transferred to the memory circuit 5 to be written into the columns 6 to 11 of the row 0 as shown in FIG. 5(a). Upon completion of the step I, the CPU 2 proceeds to the display and print flow where the date data held in the X register 11 is transferred to the output device 3 which in turn displays "100778" by the display section 3(A) and also prints it on the receipt slip for confirmation of the set data.

When the switch DS$_1$ is turned off and the switch DS$_2$ is turned on to set up the mode B and the date data is inputted in the order of day, month, and year, the step E is shifted to the step J to process the mode B. The date data placed in the X register 11 in the order of day, month, and year is rearranged to put them in the order of year, month, and day in the steps J, K and L to be temporarily loaded in the Y register 12. In the next step I, the date data is written into the memory circuit 5 as described above.

When the switches $DS_1$ and $DS_2$ are both turned off to specify the mode C, and the date data is entered in the order of year, month, and day, the CPU 2 proceeds from the step C directly to the step I to effect the writing of it into the memory circuit 5 because there is no need of changing the order of the sequence.

Following the setting of the date data, the time-of-day data is set. In setting the time-of-day data, when the time-of-day data is 12:35:00, "123500" is entered by the entry key TK, and then D/T key is depressed. Upon depressing the D/T key, the CPU 2 proceeds through the step A to the step B where whether the depression of the D/T key is the first time or not is judged. In this case, the result of the judgement is "NO" because the D/T key HK was depressed once at the time of setting the date data. Then, the step N is executed to set the time-of-day data "123500" of "hour", "minute" and "second" into the columns 0 to 5 "$M_{0-5}$" of the row 0 of the memory circuit 5, as shown in FIG. 5(b).

After the date data and the time-of-day data are set in the memory circuit 5 as mentioned above, the timekeeping is performed by the timekeeping circuit 6 based on the set data. Upon completion of the setting process, the control lock CL is set in the "registering" position to perform an ordinary cash transaction processing.

Figure 8:
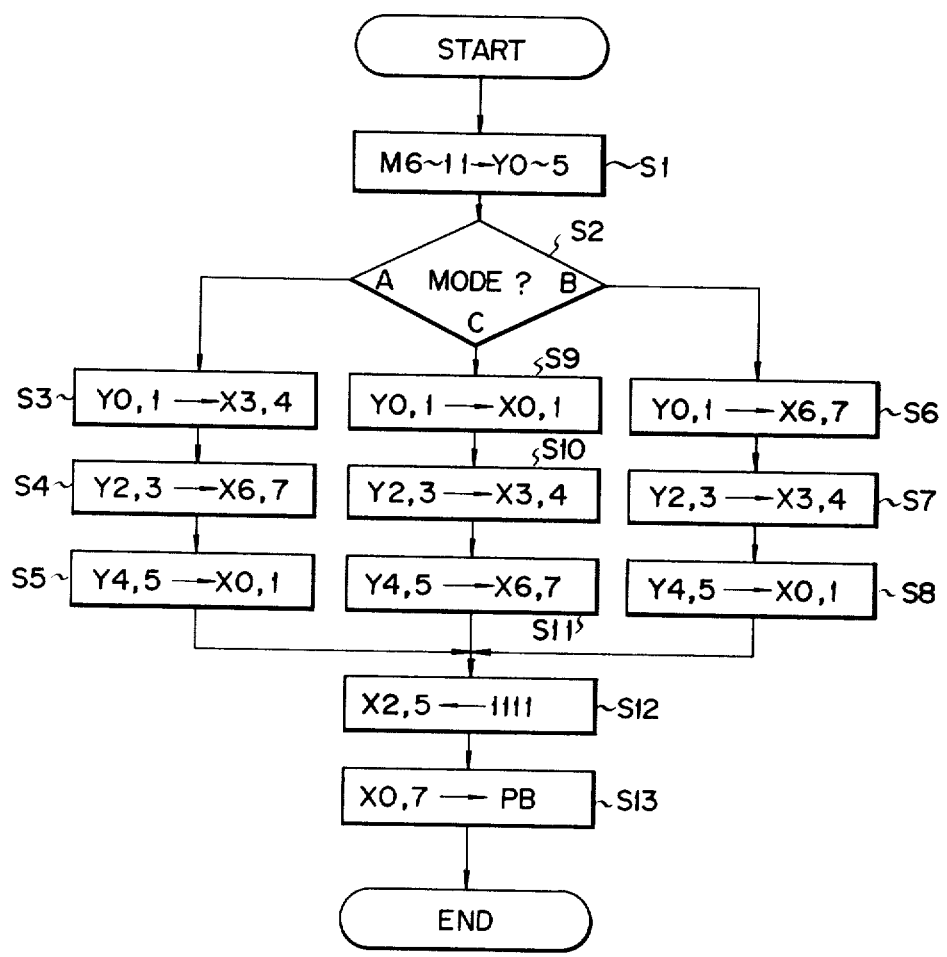
FIG. 8 is a flow chart to explain the operation of the system when the date data is printed out.

In the cash transaction processing, the receipt issuance operation starts the flow chart shown in FIG. 8, so that the date data sequence is changed according to the flow chart and the date data rearranged in the desired order is printed on the receipt slip. To be more specific, in printing the date, in the step $S_1$ of FIG. 8, the date data, e.g. 781007 stored in the columns 6 to 11, "M6-11", of the row 0 of the memory circuit 5 is read out and is set in the columns 0 to 5 of the Y register 12 in the CPU 2 as shown in FIG. 5(d). The flow proceeds to the step 2 to judge the mode selected by the use of the switches $DS_1$ and $DS_2$. If the mode A was selected, steps $S_3$ through $S_5$ are executed. If the mode B was selected, the steps $S_6$ through $S_8$ are executed. If the mode C was selected, the steps $S_9$ through $S_{11}$ are executed. In other words, in the case of the mode A, the day data, "07", held in the digits 0 and 1 of the Y register 12 is transferred to the digits 3 and 4, "X3, 4" of the X register 11 as shown in FIG. 5(c) and FIG. 5(d). In the next step $S_4$, the month data, "10", held in the digits 2 and 3 of the Y register 12 is transferred to the digits 6 and 7 of the X register 11. Then, in the step $S_5$, the year data, "78", held in the digits 4 and 5 of the Y register 12 is transferred to the digits 1 and 0 of the X register 11. The foregoing steps $S_3$, $S_4$, and $S_5$ arrange the order of the date data into the month, day, and year of the mode A. Following this, a step $S_{12}$ is executed where a marker code such as a blanking code BC "1111" is written in the digits 2 and 5, "X2, 5", of the X register 11 as shown in FIG. 5(c). A step $S_{13}$ is executed where the date data "10-07-78" set in the digits 0 to 7 of the X register 11 is transferred to the print buffer register PB in the output device 3, so that the month, day, and year in the order "10-07-78" are printed on the receipt slip 21 as shown in FIG. 7. When the mode selected is judged as the mode B in the step $S_2$, the date data is arranged to be in the order of day, month, year in the steps $S_6$, $S_7$, and $S_8$, and the blanking code BC is written in the digits 2 and 5, "X2, 5", of the X register 11 in the step $S_{12}$. When the mode selected is judged as the mode C in the step $S_2$, the steps $S_9$ through $S_{11}$ do not change the order of the date data of year, month and day but shift the digits only and the blanking code BC is written in the digits 2 and 5, "X2, 5", of the X register 11 in the step $S_{12}$, and further in step $S_{13}$, the contents in the digits 0 through 7, "X0-7", of the X register 11 is transferred to the print buffer register PB of the output device 3 to effect the printing process.

What is claimed is:

1. A timekeeper equipped electronic cash register comprising:
   a time count circuit for outputting a time count signal obtained by frequency dividing a reference pulse signal generated at a predetermined cycle;
   a first memory means coupled to the time count circuit to store in a time count sequence date data at least including month and day units, said date data being sequentially updated for each day on a basis of the time count signal from the time count circuit;
   a central processing unit coupled to the first memory means;
   a keyboard coupled to said central processing unit and having a control switch means settable for designating various modes including a registration mode, setting mode and settlement mode; data input keys for inputting data including amount data and date data; a date setting key for causing the transferring of the date data to the first memory means via the central processing unit; and a receipt sheet issuing key for causing the issuing of a receipt sheet when a transaction is completed for a customer;
   a printing device coupled to the central processing unit to print sales amount, date data, etc., on the receipt sheet; and
   mode switch means coupled to the keyboard and settable to selectively designate different input sequences of date data inputted by the data input keys and different printing output sequences of the date data in the printing device,
   in which said central processing unit comprises:
   first converting means for causing date data comprised of a plurality of date units inputted by the operation of the data input keys to be converted to date data arranged in a time count sequence on the basis of the setting of the mode switch means when the date setting key is operated with the control switch means set in a setting mode;
   second memory means for storing date data converted by the first converting means in the time count sequence;
   writing means for causing the time-sequenced date data stored in the second memory means to be written into the first memory means;
   reading means for reading out the date data in the first memory means when the receipt sheet issuing key is operated with the control switch means set at least to the registration mode;
   a second converting means for causing the read-out time-sequenced data to be converted to date data whose date units are arranged in the seuence designated by the setting of the mode switch means, and for causing insertion of a marker code between said date units thereof so that a separation is provided on the receipt sheet between said date units; and means for causing date data including the marker code to be delivered as printing data to the printing device.

2. The timekeeper equipped electronic cash register of claim 1, wherein said mode switch means selectively sets one of the following sequences of date data:
month, date, year; or
date, month, year; or
year, month, date.

* * * * *

UNITED STATES PATENT AND TRADEMARK OFFICE
CERTIFICATE OF CORRECTION

PATENT NO. : 4,424,567

DATED : January 3, 1984

INVENTOR(S) : Kunio YASUTAKE

It is certified that error appears in the above-identified patent and that said Letters Patent is hereby corrected as shown below:

COLUMN 4, line 49, after "4 and 5 of the" change "X" to --Y--.

Signed and Sealed this

Seventh Day of August 1984

[SEAL]

Attest:

GERALD J. MOSSINGHOFF

Attesting Officer     Commissioner of Patents and Trademarks